(12) United States Patent
Tsurumi

(10) Patent No.: US 10,346,992 B2
(45) Date of Patent: Jul. 9, 2019

(54) INFORMATION PROCESSING APPARATUS, INFORMATION PROCESSING METHOD, AND PROGRAM

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 41 days.

(21) Appl. No.: 15/318,832

(22) PCT Filed: Jul. 15, 2015

(86) PCT No.: PCT/JP2015/003579
§ 371 (c)(1),
(2) Date: Dec. 14, 2016

(87) PCT Pub. No.: WO2016/017101
PCT Pub. Date: Feb. 4, 2016

(65) Prior Publication Data
US 2017/0140547 A1 May 18, 2017

(30) Foreign Application Priority Data
Jul. 30, 2014 (JP) ................................. 2014-155226

(51) Int. Cl.
*G06K 9/00* (2006.01)
*G06T 7/246* (2017.01)
(Continued)

(52) U.S. Cl.
CPC .............. *G06T 7/246* (2017.01); *G01B 11/24* (2013.01); *G01B 11/26* (2013.01); *G06F 3/01* (2013.01);
(Continued)

(58) Field of Classification Search
CPC ............. G06T 7/246; G06T 7/73; G06T 7/90; G01B 11/24; G01B 11/26; G06F 3/01;
(Continued)

(56) References Cited

U.S. PATENT DOCUMENTS 6,771,294 B1 * 8/2004 Pulli ....................... G06F 3/011
345/173
8,228,315 B1 * 7/2012 Starner ................ G02B 27/017
345/175

(Continued)

FOREIGN PATENT DOCUMENTS

JP 2000-172163 6/2000
JP 2005-018385 1/2005
(Continued)

Primary Examiner — Jose L Couso
(74) Attorney, Agent, or Firm — Paratus Law Group, PLLC

(57) ABSTRACT

There is provided an information processing apparatus, an information processing method, and a program that are capable of detecting contact with high precision at low cost, the information processing apparatus including a contact determination unit. The contact determination unit determines contact of an operation body with a target object on the basis of a change in a normal line vector on a surface of the target object, the target object being an operation target of the operation body.

18 Claims, 13 Drawing Sheets

(51) Int. Cl.
    G01B 11/26    (2006.01)
    G06F 3/01     (2006.01)
    G01B 11/24    (2006.01)
    G06F 3/042    (2006.01)
    G09G 3/00     (2006.01)
(52) U.S. Cl.
    CPC .............. G06F 3/011 (2013.01); G06F 3/017 (2013.01); G06F 3/0426 (2013.01); G09G 3/002 (2013.01)
(58) Field of Classification Search
    CPC .......... G06F 3/011; G06F 3/013; G06F 3/014; G06F 3/017; G06F 3/0426; G06F 3/0233; G06F 3/0304; G06F 3/042; G06F 3/0425; G06F 3/0488; G06F 3/04886; G06F 3/04817; G06F 1/163; G06F 1/1673; G06F 1/1696; G06F 2203/04808; G06F 2203/04809; G09G 3/002; G02B 27/286; G02B 26/10; G02B 27/017; G02B 2027/0138; G02B 2027/014; G03B 17/54; G03B 21/00; H04N 9/3161; H04N 9/3194; G06K 2007/10504; G06K 7/10801; G06K 7/10821
    See application file for complete search history.

(56) References Cited

U.S. PATENT DOCUMENTS

| | | | | |
|---|---|---|---|---|
| 9,911,240 | B2* | 3/2018 | Bedikian | G06T 19/006 |
| 2010/0026723 | A1* | 2/2010 | Nishihara | G06F 3/04886 |
| | | | | 345/671 |
| 2010/0199232 | A1* | 8/2010 | Mistry | G06F 1/163 |
| | | | | 715/863 |
| 2013/0257751 | A1* | 10/2013 | Stafford | G06F 3/0488 |
| | | | | 345/173 |
| 2015/0103004 | A1* | 4/2015 | Cohen | G06F 3/0483 |
| | | | | 345/158 |
| 2015/0109197 | A1* | 4/2015 | Takagi | G06F 3/011 |
| | | | | 345/156 |
| 2015/0185857 | A1* | 7/2015 | Jung | G06F 3/0304 |
| | | | | 345/156 |
| 2015/0186039 | A1* | 7/2015 | Ide | G06F 3/0488 |
| | | | | 345/168 |
| 2015/0277760 | A1* | 10/2015 | Tagaya | G06F 3/0488 |
| | | | | 715/711 |
| 2015/0332075 | A1* | 11/2015 | Burch | G06K 7/10821 |
| | | | | 345/156 |
| 2015/0346829 | A1* | 12/2015 | Chang | G06F 3/017 |
| | | | | 345/156 |
| 2015/0370405 | A1* | 12/2015 | Oda | G06F 3/0416 |
| | | | | 715/771 |
| 2017/0123487 | A1* | 5/2017 | Hazra | G06F 3/015 |
| 2017/0228138 | A1* | 8/2017 | Paluka | G06F 3/0488 |
| 2018/0067567 | A1* | 3/2018 | Njolstad | G06F 3/041 |
| 2018/0088792 | A1* | 3/2018 | Klein | G06F 3/04883 |
| 2018/0088794 | A1* | 3/2018 | Graham | G06F 3/03545 |

FOREIGN PATENT DOCUMENTS

| | | |
|---|---|---|
| JP | 2011-029903 | 2/2011 |
| JP | 2011-070491 | 4/2011 |
| JP | 2014-067388 | 4/2014 |
| JP | 2014-071504 | 4/2014 |
| WO | WO2010-137192 | 12/2010 |

* cited by examiner (a)

(b)

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/003579 (filed on Jul. 15, 2015) under 35 U.S.C. § 371, which claims priority to Japanese Patent Application No. 2014-155226 (filed on Jul. 30, 2014), which are all hereby incorporated by reference in their entirety.

TECHNICAL FIELD

The present technology relates to an information processing apparatus, and information processing method, and a program that are capable of detecting contact.

BACKGROUND ART

In recent years, along with diversification of utilization forms of information processing equipment, a new UI (user interface) is being researched. For example, a technology in which an icon is displayed on a head-mounted display, the icon is projected on a target object (e.g., palm and desk), and selection of the icon is input when the operation body (e.g., finger and stylus) touches the projected icon is developed.

For contact of the operation body with the target object, a stereo camera, a 3D sensor, or the like is used. The UI recognizes the target object and the operation body, and detects the position of the operation body and the plane shape of the target object on the basis of 3D information acquired from the stereo camera, 3D sensor, or the like. The UI is capable of determining, as the contact, the distance between the target object and the operation body being equal to or less than a predetermined value.

Patent Document 1: Japanese Patent Application Laid-open No. 2011-70491

SUMMARY

Problem to be Solved

However, in the above-mentioned method, it needs to provide a detection means such as a stereo camera and a 3D sensor for detecting contact, and there is a problem of increase in size of the device, increase in power consumption, and increase in cost. Further, it is difficult to use the stereo camera and 3D sensor under sunlight because of the properties thereof. Further, a user's unintended input may be made in the case where non-contact is determined as contact when the operation body approaches the target object.

In view of the circumstances as described above, it is an object of the present technology to provide an information processing apparatus, an information processing method, and a program that are capable of detecting contact with high precision at low cost.

Means for Solving the Problem

In order to achieve the above-mentioned object, an information processing apparatus according to an embodiment of the present technology includes a contact determination unit.

The contact determination unit determines contact of an operation body with a target object on the basis of a change in a normal line vector on a surface of the target object, the target object being an operation target of the operation body.

The normal line vector is a vector that faces the direction perpendicular to the surface of an object. When the operation body is in contact with the target object, the surface of the target object is deformed by contact of the operation body and the normal line vector is changed. Therefore, with the above-mentioned configuration, it is possible to determine contact of the operation body with the target object by detecting the change in the normal line vector.

The information processing apparatus may further include an object recognition processing unit that recognizes the operation body and the target object included in a picked-up image, in which the contact determination unit may determine contact of the operation body with the target object on the basis of a change in a normal line vector on a surface of the target object around the operation body.

With this configuration, it is possible to reduce the amount of calculation for calculating the change in the normal line vector and prevent error detection because the contact determination unit uses only an area of the surface of the target object with which the operation body is highly likely to be in contact for contact determination.

The contact determination unit may determine contact of the operation body with the target object depending on an inclination of the normal line vector in a direction of the operation body.

In the case where the target object is an object (palm, etc.) in which a depression is formed by pressing of the operation body, the normal line vector is inclined in the direction of the operation body by contact of the operation body. Therefore, the contact determination unit is capable of using the inclination of the normal line vector in the direction of the operation body for contact determination.

The contact determination unit may determine contact of the operation body with the target object depending on disturbance of an inclination of the normal line vector.

In the case where the target object is an object (back of the hand, etc.) that gets wrinkles by pressing of the operation body, the normal line vector is disturbed by contact of the operation body, and is inclined in various directions. Therefore, the contact determination unit is capable of using the disturbance of the inclination of the normal line vector for contact determination.

The information processing apparatus may further include an input control unit that controls an operation input on the basis of a determination result of the contact determination unit.

When the contact determination unit determines contact between the operation body and the target object, the input control unit is capable of receiving it as an operation input depending on the contact position or the number of contacts, and supplying the operation input to the OS or the like.

The information processing apparatus may further include an object recognition processing unit that recognizes the operation body and the target object included in a picked-up image, in which the input control unit may control an operation input on the basis of a shape of the operation body recognized by the object recognition processing unit and a determination result of the contact determination unit.

The object recognition processing unit may recognize the shape of the operation body (e.g., the shape of fingers at the time of pinching operation), and supply it to the input control unit. Accordingly, the input control unit is capable of receiving the operation input depending on the shape of the operation body.

The information processing apparatus may further include an image output unit that generates an operation target image superimposed on the target object, in which the input control unit may control an operation input on the basis of a positional relationship between the operation body and the target object in the operation target image.

The image output unit generates an operation target image that is displayed on a head mounted display, projector, or the like, and superimposed on the target object. The input control unit is capable of calculating the positional relationship between the operation target image and the contact position on the basis of the contact position in the operation target image and the superimposition position of the operation target image on the target object, and receiving an operation input depending on the content (icon, etc.) of the operation target image superimposed on the contact position.

The contact determination unit may determine that the operation body is in contact with the target object when an inclination of the normal line vector exceeds a threshold value.

With this configuration, it is possible to adjust the precision of contact detection by a threshold value.

The information processing apparatus may further include an object recognition processing unit that recognizes the operation body and the target object included in a picked-up image, in which the contact determination unit may determine the threshold value depending on a kind of the target object.

With this configuration, the contact determination unit is capable of determining contact with an appropriate threshold value depending on the kind of the target object. For example, it is possible to decrease the threshold value when the target object is hard and increase the threshold value when the target object is soft.

The contact determination unit may further determine the threshold value depending on a position of a surface of the target object.

For example, in the case where the target object is a palm, the degree of depression is different for the position even if the palm is pressed with the same pressing force. Therefore, with the above-mentioned configuration, it is possible to determine contact with an appropriate threshold value depending on the position of the target object.

The contact determination unit may calculate a degree of contact of the operation body with the target object depending on a magnitude of an inclination of the normal line vector when an inclination of the normal line vector is larger than the threshold value.

The degree of deformation of the target object due to contact of the operation body with the target object is increased with the pressing force of the contact. Therefore, with the above-mentioned configuration, it is possible to calculate not only the contact of the operation body with the target object but also the pressing force of the operation body on the target object.

The information processing apparatus may further include an object recognition processing unit that recognizes the operation body and the target object included in a picked-up image, in which the contact determination unit may determine contact of the operation body with the target object on the basis of a change in a color of the picked-up image when the target object is a rigid body, and may determine contact of the operation body with the target object on the basis of a change in the normal line vector when the target object is not a rigid body.

In the case where the target object is a rigid body and the target object is not deformed by contact of the operation body, the contact determination unit is capable of determining contact by using the change in a color of a picked-up image. For example, because the color of a fingertip is changed when the finger is pressed by an object, the contact determination unit is capable of determining contact by using such a change in a color.

The contact determination unit may determine contact of the operation body with the target object on the basis of a change in the normal line vector when a distance between the target object and the operation body is equal to or less than a predetermined value.

The contact determination unit determines contact on the basis of the change in a color of the image when the distance between the target object and the operation body is smaller than a predetermined value. Accordingly, it is possible to determine contact only in the case where the possibility of contact is high. The distance between the target object and the operation body can be acquired by a depth sensor that uses a projection pattern of an infrared ray and the like to measure the distance between the sensor and the object.

The contact determination unit may detect the normal line vector from a picked-up image picked up by polarization imaging.

The polarization imaging is achieved by a camera in which a polarizing filter having a different polarizing direction is provided to each pixel, and the normal line vector can be detected from the picked-up image.

In order to achieve the above-mentioned object, a program according to an embodiment of the present technology causes an information processing apparatus to function as a contact determination unit.

The contact determination unit determines contact of an operation body with a target object on the basis of a change in a normal line vector on a surface of the target object, the target object being an operation target of the operation body.

In order to achieve the above-mentioned object, an information processing method according to an embodiment of the present technology includes determining, by a contact determination unit, contact of an operation body with a target object on the basis of a change in a normal line vector on a surface of the target object, the target object being an operation target of the operation body.

Effects

As described above, according to the present technology, it is possible to provide an information processing apparatus, an information processing method, and a program that are capable of detecting contact with high precision at low cost. It should be noted that the effect described here is not necessarily limitative and may be any effect described in the present disclosure.

DESCRIPTION OF PREFERRED EMBODIMENTS

[First Embodiment]

An information processing apparatus according to a first embodiment of the present technology will be described.

(Configuration of Information Processing Apparatus)

Figure 1:
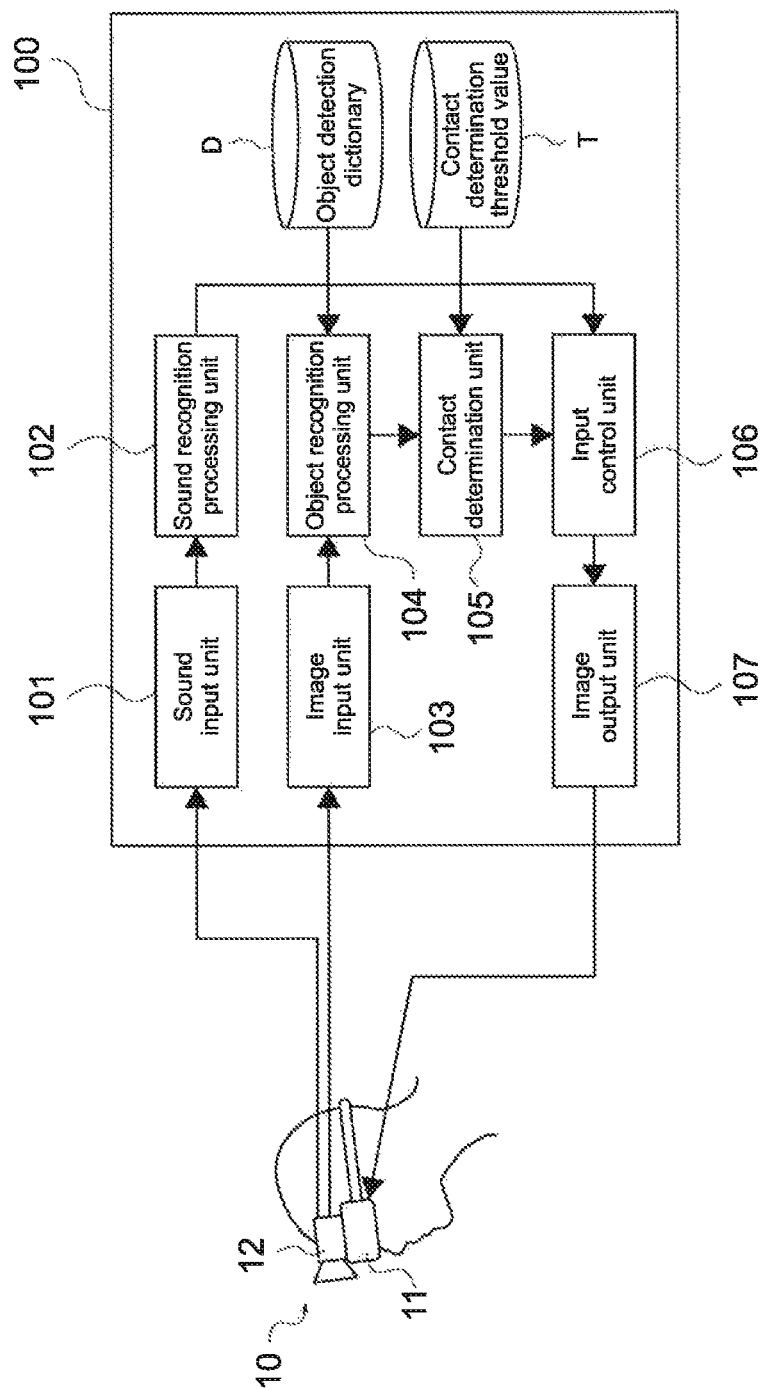
FIG. 1 A schematic diagram showing the configuration of an information processing apparatus according to a first embodiment of the present technology.

FIG. 1 is a schematic diagram showing the functional configuration of an information processing apparatus 100 according to a first embodiment of the present technology. As shown in the figure, the information processing apparatus 100 includes a sound input unit 101, a sound recognition processing unit 102, an image input unit 103, an object recognition processing unit 104, a contact determination unit 105, an input control unit 106, and an image output unit 107.

As shown in the figure, the information processing apparatus 100 can be connected to an eyewear 10. Further, the information processing apparatus 100 may be mounted on the eyewear 10. The eyewear 10 includes a display 11, a camera 12, and a microphone (not shown). The display 11 can be a see-through HMD (Head Mounted Display).

The camera 12 can be a camera capable of performing polarization imaging. Specifically, four types of polarizing films whose polarizing directions are shifted by 90 degrees may be applied to each pixel, thereby configuring the camera 12. It is possible to acquire the normal line direction (to be described later) of the surface of the imaged object by taking out a non-polarizing component strength, polarization main axis direction, and polarizing component strength by applying Fourier transform to the received light intensity of each pixel having a different polarizing direction, and obtaining an azimuth angle from the main axis direction and the zenith angle from the strength. Further, the information processing apparatus 100 may include a normal camera in addition to the camera 12.

The sound input unit 101 is connected to the microphone of the eyewear 10. The audio signal of a sound collected by the microphone is input to the sound input unit 101. The sound input unit 101 outputs the acquired audio signal to the sound recognition processing unit 102.

The sound recognition processing unit 102 performs audio recognition processing on the audio signal supplied from the sound input unit 101, and recognizes the operation sound by a user. In the case where the operation sound is recognized, the sound recognition processing unit 102 supplies the recognition result to the input control unit 106.

The image input unit 103 is connected to the camera 12. An image (moving image) picked up by the camera 12 is input to the image input unit 103. The image picked up by the camera 12 is an image picked up by polarization imaging as described above. The image input unit 103 supplies the image acquired from the camera 12 (hereinafter, acquired image) to the object recognition processing unit 104.

The object recognition processing unit 104 checks the acquired image supplied from the image input unit 103 against information stored in an object detection dictionary D to recognize an object. The object recognition processing unit 104 is capable of recognizing an object such as an operation body and a target object to be described later. The object recognition processing unit 104 supplies the acquired image and the object recognition result to the contact determination unit 105. The object detection dictionary D may be stored in the information processing apparatus 100, or the object recognition processing unit 104 may acquire the object detection dictionary D from a network or the like.

The contact determination unit 105 performs contact determination on the acquired image supplied from the object recognition processing unit 104 by using the object recognition result and a contact determination threshold value T. Details of this processing will be described later. The contact determination unit 105 supplies the determination result to the input control unit 106. The contact determination threshold value T may be stored in the information processing apparatus 100, or the contact determination unit 105 may acquire the contact determination threshold value T from a network or the like.

The input control unit 106 controls an operation input by a user on the basis of the recognition result supplied from the sound recognition processing unit 102 or the determination result supplied from the contact determination unit 105. Specifically, the input control unit 106 receives the contact position, pressing force, or pressing direction of an operation body with a target object, movement of an operation body after the contact, or the like, as an operation input of touching, multi-touching, dragging, pinching, or the like. The input control unit 106 supplies the received operation input to the OS of the information processing apparatus 100 or the like.

The image output unit 107 generates an image (moving image) displayed on the display 11. The image output unit 107 is capable of generating an operation image including an icon and an operation button. As described above, the display 11 is a see-through HMD, and the user visually confirms the field of view in which videos displayed on the display 11 and the real object are superimposed one another.

Figure 2:
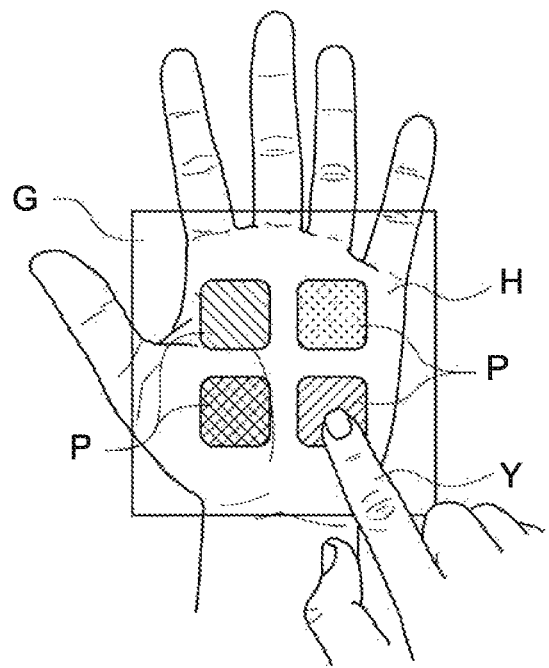
FIG. 2 A schematic diagram showing an operation image superimposed on a target object, which is generated by an image output unit of the information processing apparatus.

FIG. 2 schematically shows a user's field of view via the display 11. The user's field of view includes a palm H of the user, a finger Y of the user, and an operation image G displayed on the display 11. The operation image G includes icons P. When the user touches a part of the palm H on which the icon P is superimposed with the finger Y, the information processing apparatus 100 receives selection of the icon P.

Figure 3:
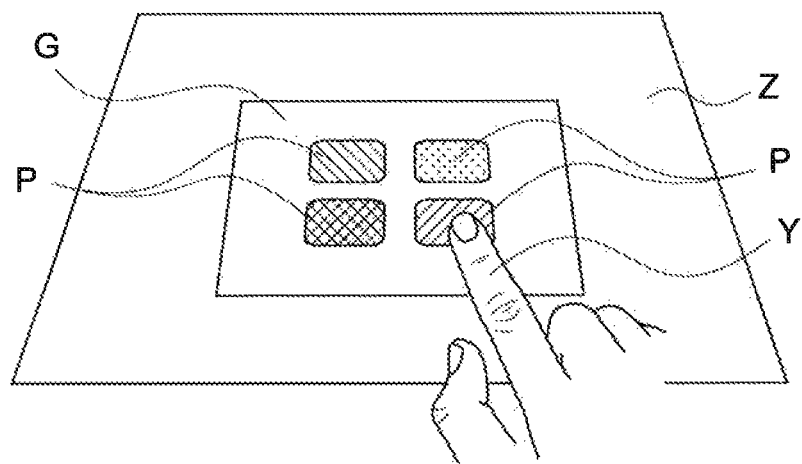
FIG. 3 A schematic diagram showing the operation image superimposed on the target object, which is generated by the image output unit of the information processing apparatus.

The operation image G does not necessarily need to be superimposed on the palm. FIG. 3 is a schematic diagram showing the state where the operation image G is superimposed on a magazine Z. As shown in the figure, when the user touches a part of the magazine Z on which the icon P is superimposed with the finger Y, the information processing apparatus 100 receives selection of the icon P. Further, the user may designate the icon P with a thing other than the finger such as a stylus. Hereinafter, an object (e.g., the palm H and the magazine Z) on which the operation image G is projected, which is designated by the user, is referred to as the target object, and an object (e.g., the finger Y and the stylus) that is in contact with the target object and operates the icon P or the like is referred to as the operation body. Specifically, the information processing apparatus 100 detects contact of the operation body with the target object, and receives an operation input in response to the contact.

Figure 4:
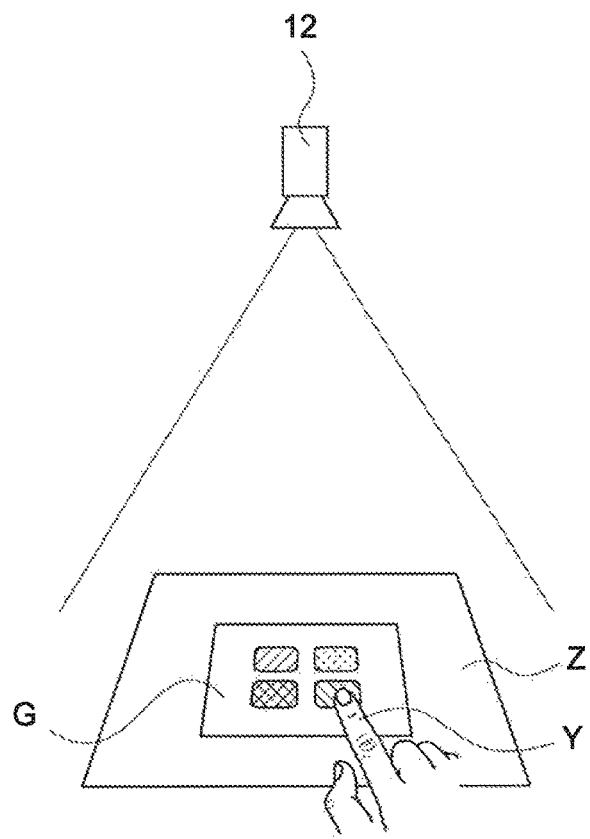
FIG. 4 A schematic diagram showing the operation image superimposed on the target object, which is generated by the image output unit of the information processing apparatus.

The configuration of the eyewear 10 is not limited to the above-mentioned configuration. FIG. 4 shows the state where the camera 12 is provided independent of the eyewear 10. The operation image G is displayed on the display 11, and superimposed on the magazine Z. The camera 12 is provided at a position (e.g., on the upper side of the magazine Z) different from that of the eyewear 10, and is connected to the image input unit 103.

Further, the information processing apparatus 100 may be connected to an image projection apparatus different from the eyewear 10. For example, it may be connected to a projector including a camera capable of projecting videos on a desk or wall surface and imaging a projection surface. In this case, the image output unit 107 is connected to an image projection mechanism of the projector, and projects videos on the target object (desk or wall). The image input unit 103 is connected to the camera, and acquires an image including the target object and the projected image. Alternatively, the information processing apparatus 100 may be connected to an apparatus including a camera capable of displaying or projecting videos on the target object and imaging the target object.

The above-mentioned functional configuration of the information processing apparatus 100 may be connected or incorporated to/in an image projection apparatus such as an eyewear and a projector, or mounted on a PC, smartphone, or the like different from the image projection apparatus. Further, the whole or a part of the functional configuration may be on a network.

Figure 5:
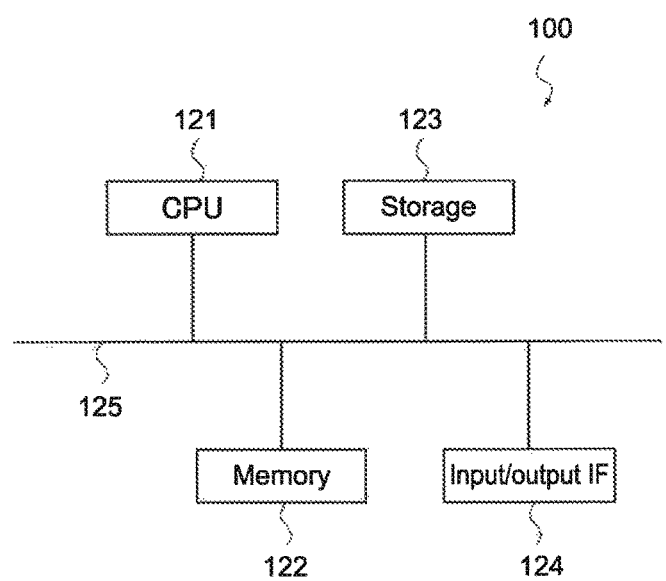
FIG. 5 A schematic diagram showing a hardware configuration of the information processing apparatus.

FIG. 5 is a schematic diagram showing the hardware configuration of the information processing apparatus 100. The above-mentioned configuration of the information processing apparatus 100 is a functional configuration achieved by cooperation of the hardware configuration shown in FIG. 5 and a program.

As shown in FIG. 5, the information processing apparatus 100 includes a CPU 121, a memory 122, a storage 123, and an input/output IF 124 as a hardware configuration. These are connected to each other by a bus 125.

The CPU (Central Processing Unit) 121 controls another configuration in accordance with a program stored in the memory 122, performs data processing in accordance with the program, and stores the processing result in the memory 122. The CPU 121 can be a microprocessor.

The memory 122 stores a program executed by the CPU 121 and data. The memory 122 can be a RAM (Random Access Memory).

The storage 123 stores a program or data. The storage 123 can be an HDD (Hard disk drive) or an SSD (solid state drive). The storage 123 is capable of storing the above-mentioned object detection dictionary D or the above-mentioned contact determination threshold value T.

The input/output IF (interface) 124 receives an input to the information processing apparatus 100, and supplies an output of the information processing apparatus 100 to the display 11 or the like. The input/output IF 124 includes input equipment such as a mouse and a touch panel, output equipment such as the display 11, and a connection interface such as a network. As described above, the information processing apparatus 100 is capable of receiving a user's operation input on the basis of the image acquired by the image input unit 103. In this case, the input is received not via the input/output IF 124. The image generated by the image output unit 107 is output to the display 11 via the input/output IF 124, and displayed.

The hardware configuration of the information processing apparatus 100 is not limited to those described herein as long as the above-mentioned functional configuration of the information processing apparatus 100 can be achieved.

(Contact Determination Operation of Information Processing Apparatus)

Figure 6:
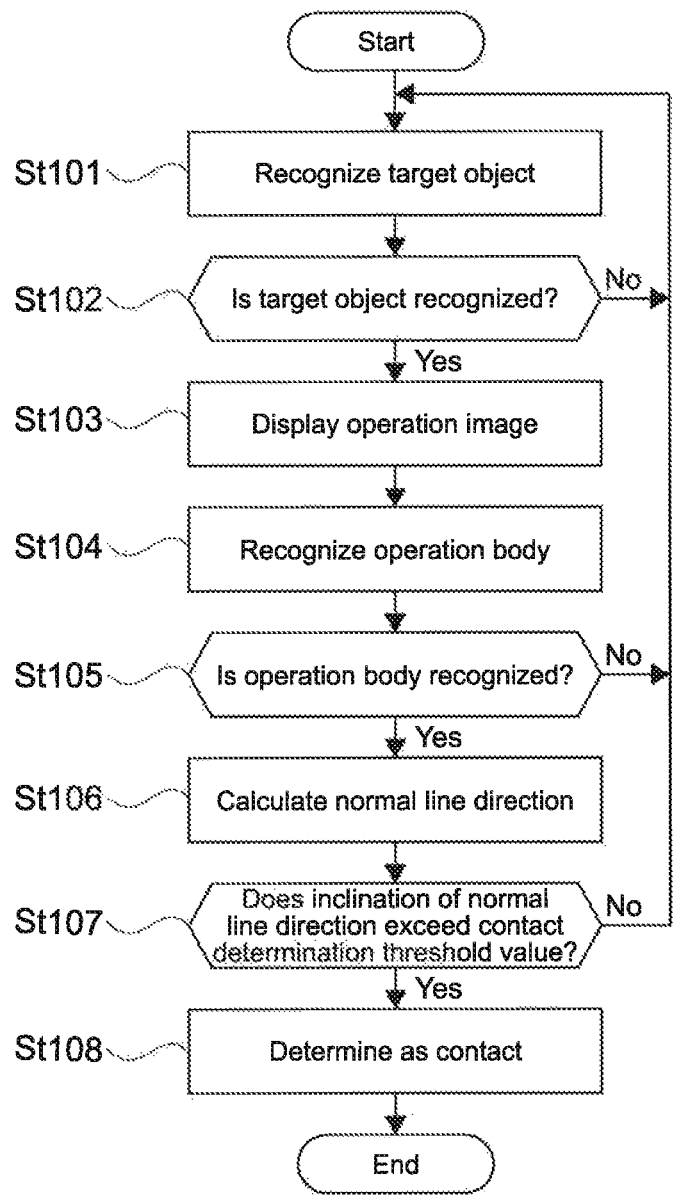
FIG. 6 A flowchart showing an operation of the information processing apparatus.

An operation of the information processing apparatus 100 will be described. FIG. 6 is a flowchart showing the operation of the information processing apparatus 100. As described above, the camera 12 picks up an image, and the image input unit 103 acquires the image (acquired image). The image input unit 103 supplies the acquired image to the object recognition processing unit 104.

The object recognition processing unit 104 recognizes the target object (St101). The object recognition processing unit 104 recognizes the target object by checking the acquired image acquired from the image input unit 103 against the object detection dictionary D. Accordingly, when the acquired image includes a palm, magazine, or the like, for example, it is recognized as the target object.

In the case where the target object is recognized in the acquired image (St102: Yes), the image output unit 107 supplies the operation image G (see FIG. 2) to the display 11, and causes the display 11 to display the operation image G (St103). In the case where no target object is recognized in the acquired image (St102: No), recognition of the target object by the object recognition processing unit 104 (St101) is performed again.

Next, the object recognition processing unit 104 recognizes the operation body (St104). The object recognition processing unit 104 recognizes the operation body by checking the acquired image against the object detection dictionary D. Accordingly, when the acquired image includes a finger, stylus, or the like, for example, it is recognized as the operation body. Note that the object recognition processing unit 104 may recognize a plurality of operation bodies.

In the case where the operation body is recognized in the acquired image (St105: Yes), the contact determination unit 105 calculates the direction of the normal line vector (hereinafter, normal line direction) on the surface of the target object included in the acquired image (St106). In the case where no operation body is recognized in the acquired image (St105: No), recognition of the target object by the object recognition processing unit 104 (St101) is performed again.

Figure 7:
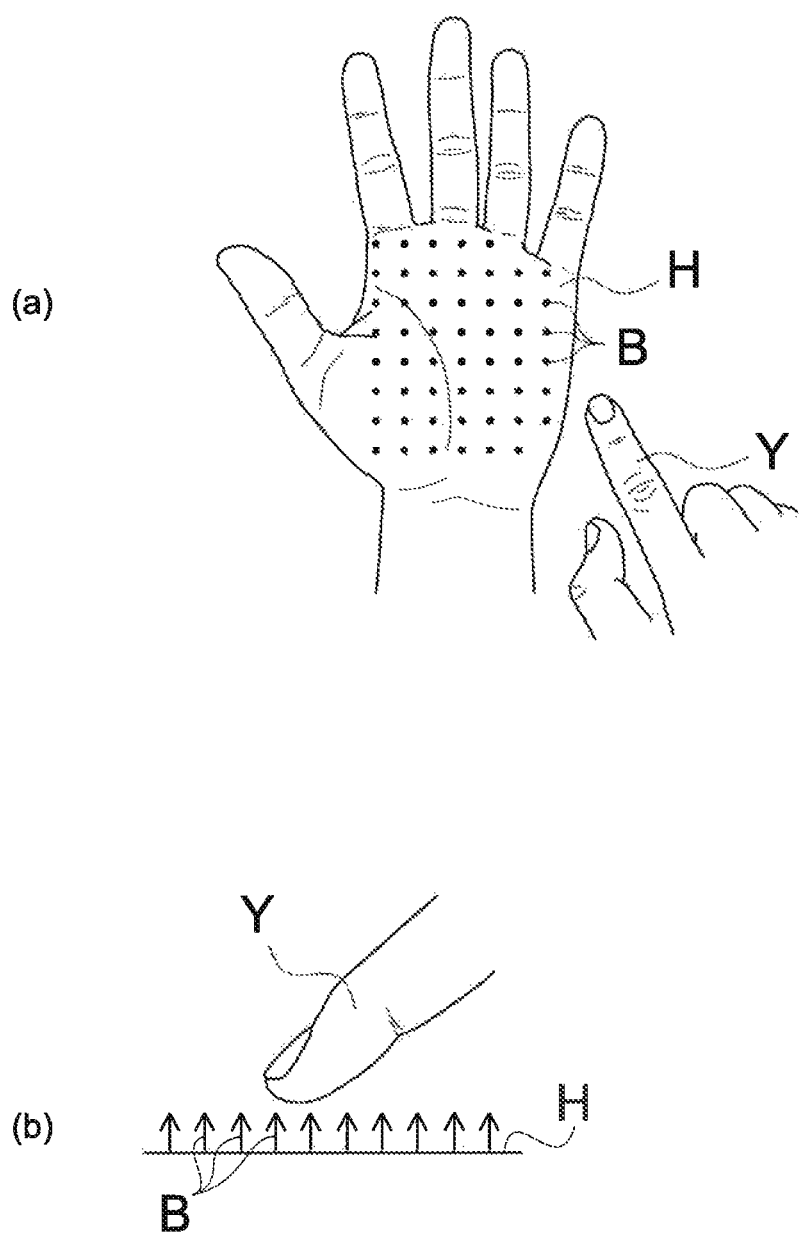
FIG. 7 A schematic diagram showing the normal line vector in the target object in the state where the operation body is not in contact with the target object.
Figure 8:
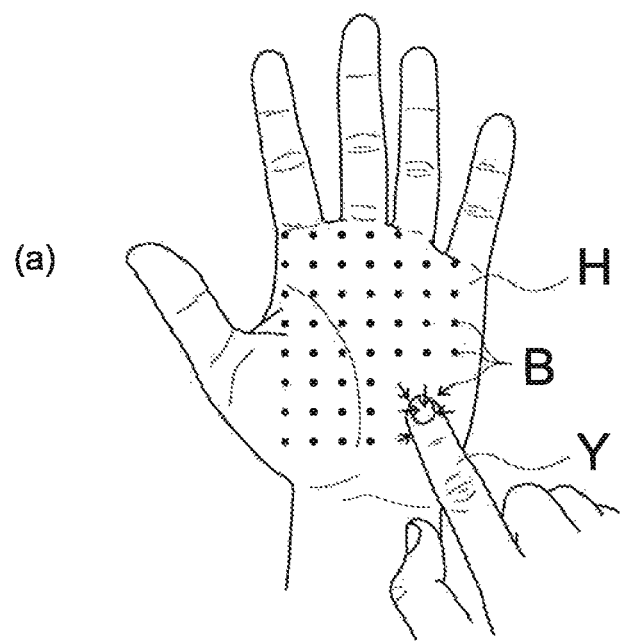
FIG. 8 A schematic diagram showing the normal line vector in the target object in the state where the operation body is in contact with the target object.
Figure 8:
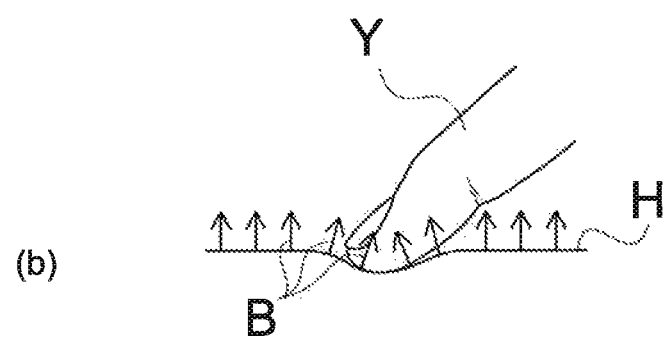

FIGS. 7 and 8 are each a schematic diagram showing normal line vectors B on the surface of the target object. FIG. 7 shows the state where the operation body (finger Y) is not in contact with the target object (palm H). Part (a) of FIG. 7 is a plan view, and part (b) of FIG. 7 is a side view.

As shown in the figure, the contact determination unit 105 detects the normal line vector B on the surface of the palm H. The normal line vector is a vector perpendicular to the surface of the object, and the size thereof is 1. As described above, the camera 12 is a camera capable of performing polarization imaging, and the contact determination unit 105 is capable of detecting the normal line vector B from the acquired image picked up by the camera 12.

FIG. 8 shows the state where the operation body (finger Y) is in contact with the target object (palm H). Part (a) of FIG. 8 is a plan view, and part (b) of FIG. 8 is a side view. As shown in the figure, when the finger Y is in contact with the palm H and presses the palm H, the surface of the palm H is depressed. Accordingly, the normal line vector B detected in the surface of the palm H is inclined in the direction of the finger Y.

The contact determination unit 105 detects contact on the basis of the change in the normal line vector B due to contact of the operation body with the target object. Specifically, the contact determination unit 105 is capable of determining that the finger Y is in contact with the palm H (St107: Yes) when the inclination of the direction of the normal line vector B (hereinafter, normal line direction) exceeds the contact determination threshold value T. The contact determination unit 105 may compare the inclination of the normal line vector B having the largest inclination out of the normal line vectors B in which the change in the normal line direction occurs with the contact determination threshold value T, or the average value of the inclination of the normal line vector B that is inclined with the contact determination threshold value T. Further, the contact determination unit 105 is capable of determining that the finger Y is not in contact with the palm H (St107: No) when the inclination of the normal line direction is smaller than the contact determination threshold value T.

Note that the contact determination unit 105 may determine that the finger Y is in contact with the palm H only when the inclination of the normal line direction in the direction of the finger Y exceeds the contact determination threshold value T. This is because the normal line direction may be inclined by another reason different from contact of the finger Y in the case where the direction is not the direction of the finger Y even when the inclination of the normal line direction is large. Specifically, it is possible to improve the detection precision by using only the inclination of the normal line direction in the direction of the finger Y for contact determination.

Figure 9:
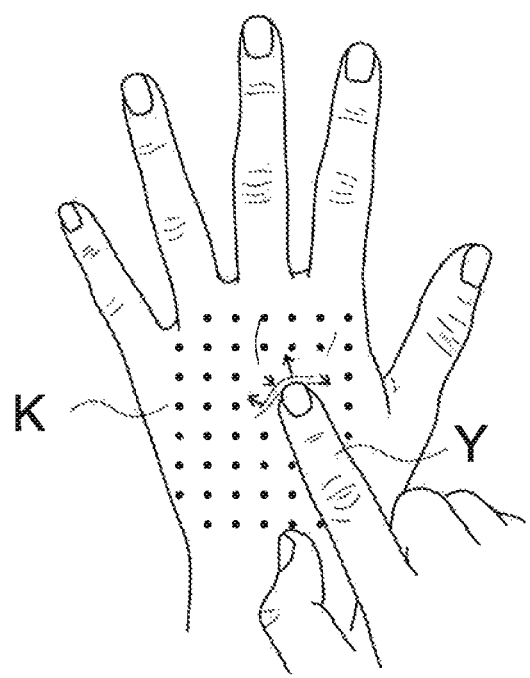
FIG. 9 A schematic diagram showing the normal line vector in the target object in the state where the operation body is in contact with the target object.

Further, the contact determination unit 105 may detect contact of the operation body with the target object depending on the disturbance of the normal line direction. FIG. 9 is a schematic diagram showing a back of the hand K as the target object and the finger Y as the operation body. As shown in the figure, in the case where the target object is a back of the hand, the surface is not depressed in contrast to the palm and gets wrinkles when the operation body is in contact with it. The contact determination unit 105 is capable of detecting such generation of wrinkles from the disturbance of the normal line direction. Specifically, the contact determination unit 105 is capable of determining that the finger Y is in contact with the back of the hand K when the inclination of the normal line direction in any direction exceeds the contact determination threshold value T.

The contact determination unit 105 is capable of determining which change in the normal line vector is used for determination by using the recognition result of the object recognition processing unit 104. For example, the contact determination unit 105 is capable of using the inclination of the normal line direction in the direction of the operation body for determination in the case where the object recognition processing unit 104 detects an object in which a depression is formed by pressing such as the palm H. Further, the contact determination unit 105 is capable of using the inclination of the normal line direction in any direction for determination in the case where the object recognition processing unit 104 detects an object that gets wrinkles by pressing such as the back of the hand K.

The contact determination threshold value T may be a constant value. Alternatively, the contact determination unit 105 may determine the contact determination threshold value T by using the result of recognition of the target object by the object recognition processing unit 104. Specifically, the contact determination unit 105 is capable of using the contact determination threshold value T set depending on the kind of the target object. Further, the contact determination unit 105 may adjust the contact determination threshold value T depending on the kind of the target object. For example, the contact determination unit 105 may use a large value as the contact determination threshold value T when the target object is largely deformed by pressing of the operation body, and a small value as the contact determination threshold value T when the target object is not largely deformed by pressing of the operation body.

Further, the contact determination unit 105 may adjust the contact determination threshold value T depending on the degree of a depression formed by pressing of the operation body on the target object, i.e., the degree of the inclination of the normal line direction, or depending on the contact position of the operation body with the target object. For example, also in the case where a finger presses a palm, a large depression is formed in the vicinity of the center of the palm and a small depression is formed in the vicinity of the base of the finger. Therefore, the contact determination unit 105 is capable of using an appropriate value as the contact determination threshold value T, thereby determining contact of the operation body with the target object with higher precision.

Note that the contact determination unit 105 does not need to detect the normal line vector on all surfaces of the target object, and may detect only the normal line vector on the surface of the target object around the operation body recognized by the object recognition processing unit 104 and use it for contact determination. Accordingly, it is possible to limit the number of normal line vectors whose change in the normal line direction is tracked, reduce the number of calculation, and prevent error detection.

In the case where the contact determination unit 105 determines that the operation body is not in contact with the target object (St107: No), recognition of the target object by the object recognition processing unit 104 (St101) is performed again.

In the case where contact of the operation body with the target object is determined, the contact determination unit 105 supplies, to the input control unit 106, the contact position with the acquired image. The input control unit 106 controls an operation input on the basis of the position of the icon P displayed on the operation image G and the contact position supplied from the contact determination unit 105. The input control unit 106 can regard the icon P superimposed on the contact position as being selected, for example.

The information processing apparatus 100 performs such an operation. Since an image picked up by the camera 12 capable of performing polarization imaging can be used to detect contact of the operation body with the target object as described above, it does not need to provide a sensor for detecting contact in addition to the camera 12. Therefore, it is possible to reduce the size in the contact detection system and the cost. Further, because an infrared ray or the like is not used to detect contact, it can be used outside.

Further, the information processing apparatus 100 detects contact by using the change in the normal line vector caused due to contact of the operation body with the target object. Therefore, the information processing apparatus 100 does not detect contact when the operation body approaches the target object or is slightly in contact with the target object, and detects contact only when the operation body is certainly in contact with the target object. Therefore, it is possible to detect contact of the operation body with the target object with high precision.

Note that although the case where the operation body is a finger has been described above, the operation body is not limited to the finger and may be a stylus or the like. Further, the target object is not limited to the palm as long as the shape of the surface is changed by contact of the operation body.

Further, the object recognition processing unit 104 checks the acquired image against the object detection dictionary D to recognize the object (the target object and the operation body) in the above. However, this is not limited thereto. For example, in the case where the acquired image is not changed for a predetermined time and a some kind of object enters the acquired image (i.e., the imaging range of the camera), this object may be recognized as the operation body.

(Contact Determination Operation of Information Processing Apparatus Depending on Kind of Target Object)

Figure 10:
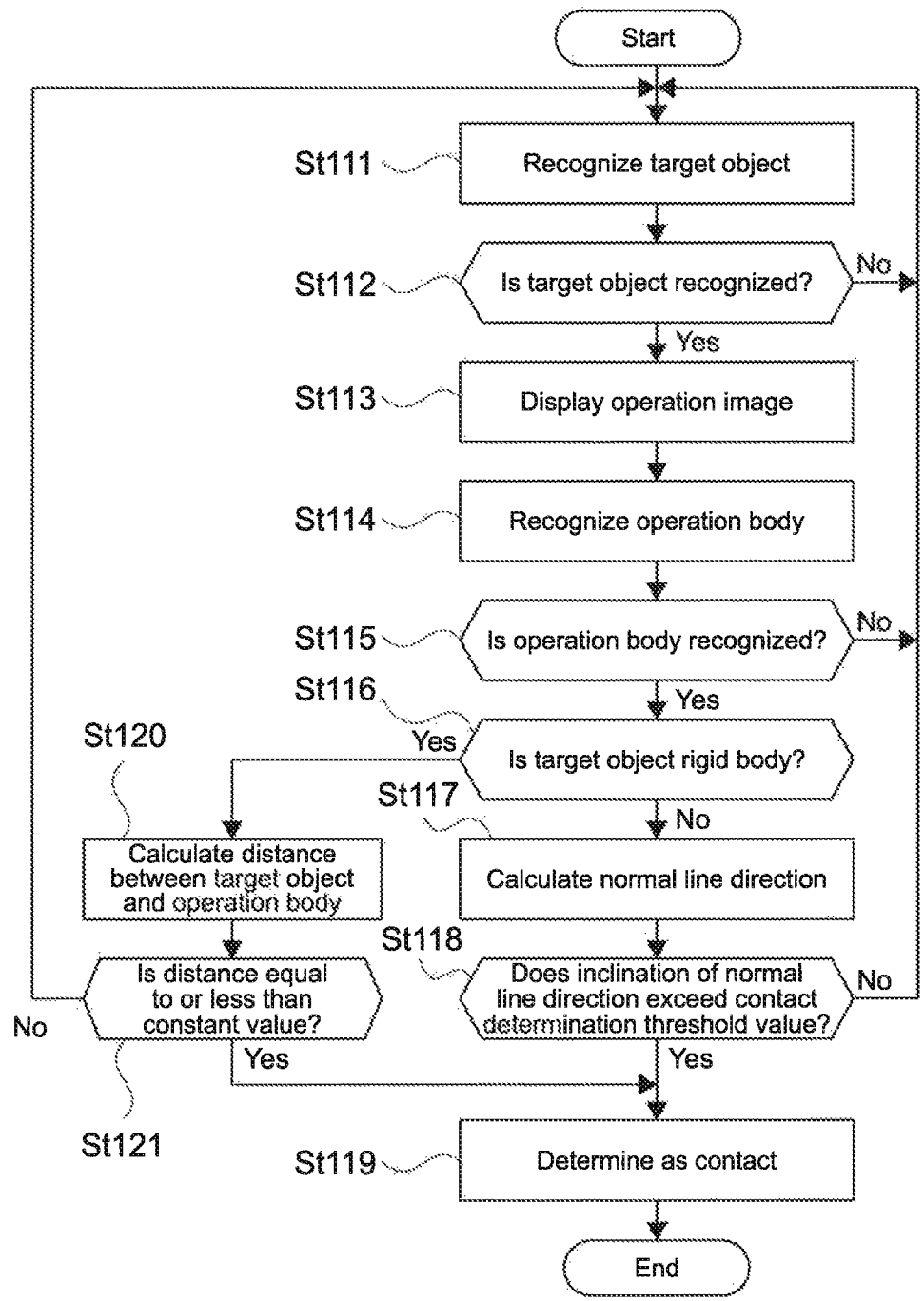
FIG. 10 A flowchart showing an operation of the information processing apparatus.

Another operation of the information processing apparatus 100 will be described. FIG. 10 is a flowchart showing another operation of the information processing apparatus 100. Note that to the eyewear 10 (or another apparatus) connected to the information processing apparatus 100, a depth sensor capable of acquiring depth information may be provided. The depth information is information on the distance between the object and the depth sensor. As described above, the camera 12 picks up an image, and the image input unit 103 acquires the image (acquired image). The input unit 103 supplies the acquired image to the object recognition processing unit 104.

The object recognition processing unit 104 recognizes the target object (St111). The object recognition processing unit 104 is capable of recognizing the target object by checking the acquired image supplied from the image input unit 103 against the object detection dictionary D. Accordingly, when the acquired image includes a palm, magazine, or the like, for example, it is recognized as the target object.

In the case where the target object is recognized in the acquired image (St112: Yes), the image output unit 107 supplies the operation image G (see FIG. 2) to the display 11, and causes the display 11 to display the operation image G (St113). In the case where no target object is recognized in the acquired image (St112: No), recognition of the target object by the object recognition processing unit 104 (St111) is performed again.

Next, the object recognition processing unit 104 recognizes the operation body (St114). The object recognition processing unit 104 recognizes the operation body by checking the acquired image against the object detection dictionary D.

Next, the object recognition processing unit 104 determines whether or not the target object is a rigid body (St116). The "rigid body" represents an object that is not deformed by contact of another object. Examples of the rigid body include a desk. The palm or magazine is determined not to be a rigid body.

The object recognition processing unit 104 determines that the target object is not a rigid body (St116: No), the contact determination unit 105 calculates the normal line direction of the surface of the target object from the acquired image (St117) as described above. In the case where the inclination of the normal line direction exceeds the contact determination threshold value T (St118: Yes), the contact determination unit 105 determines it as contact (St119). In the case where the inclination of the normal line direction is smaller than the contact determination threshold value T (St118: No), the contact determination unit 105 does not determine it as contact, and recognition of the target object by the object recognition processing unit 104 (St111) is performed again.

On the other hand, in the case where the object recognition processing unit 104 determines that the target object is a rigid body (St116: Yes), it is difficult to use the normal line direction for contact detection because the normal line direction is not changed even by contact of the operation body with the target object. Therefore, the contact determination unit 105 can determine contact without using the normal line direction.

Specifically, the contact determination unit 105 calculates the distance between the target object and the operation body (St120). The distance between the target object and the operation body can be calculated by using the depth information supplied from the depth sensor. In the case where the distance between the target object and the operation body is equal to or less than a constant value (St121: Yes), the contact determination unit 105 determines it as contact (St119). In the case where the distance between the target object and the operation body is not equal to or less than the constant value (St121: No), recognition of the target object by the object recognition processing unit 104 (St111) is performed again.

The information processing apparatus 100 is capable of performing also such an operation. Even if the target object is a rigid body and it is difficult to perform contact determination using the normal line direction, it is possible to perform contact determination. Note that the contact determination unit 105 detects contact of the operation body with the target object by using depth information in the case where the target object is a rigid body in the above description, another method may be used to detect contact.

For example, the color of a fingertip is changed when the finger is pressed by an object. In the case where the finger is not in contact with an object, for example, the color of a fingertip viewed through a nail is pink. However, the color of the tip of the finger is changed to white when the finger is pressed by an object. The contact determination unit 105 is capable of detecting contact of the finger with the target object by comparing such a change in the color of a fingertip with a pattern set in advance. Further, the contact determination unit 105 is capable of detecting contact on the basis of the change in a color similarly to the color of the fingertip as long as the operation body is an object whose color is changed when the object is pressed by the target object.

(Contact Determination Operation of Information Processing Apparatus Combined by Use of Depth Information)

Another operation of the information processing apparatus 100 will be described. Note that a depth sensor capable of acquiring depth information is provided to the eyewear 10 (or another apparatus) connected to the information processing apparatus 100.

Figure 11:
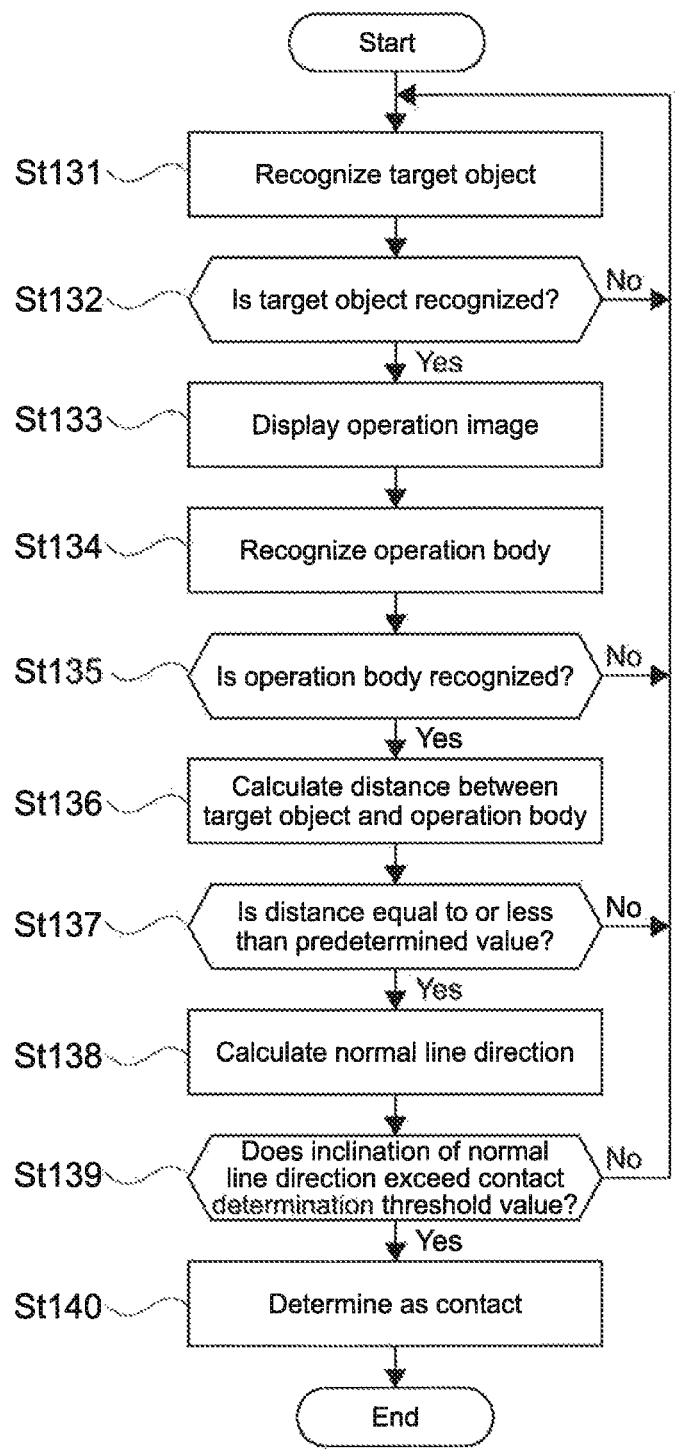
FIG. 11 A flowchart showing an operation of the information processing apparatus.

FIG. 11 is a flowchart showing another operation of the information processing apparatus 100. As described above, the camera 12 picks up an image, and the image (acquired image) is acquired by the image input unit 103. The image input unit 103 supplies the acquired image to the object recognition processing unit 104.

The object recognition processing unit 104 recognizes the target object (St131). The object recognition processing unit 104 recognizes the target object by checking the acquired image acquired from the image input unit 103 against the object detection dictionary D.

In the case where the target object is recognized in the acquired image (St132: Yes), the image output unit 107 supplies the operation image G (see FIG. 2) to the display 11, and causes the display 11 to display the operation image G (St133). In the case where no target object is recognized in the acquired image (St132: No), recognition of the target object by the object recognition processing unit 104 (St131) is performed again.

Next, the object recognition processing unit 104 recognizes the operation body (St134). The object recognition processing unit 104 is capable of recognizing the operation body by checking the acquired image against the object detection dictionary D. Note that the object recognition processing unit 104 may recognize a plurality of operation bodies.

In the case where the operation body is recognized in the acquired image (St135: Yes), the contact determination unit 105 calculates the distance between the operation body and the target object by using the depth information (St136). The contact determination unit 105 is capable of acquiring the depth information from the depth sensor, as described above. In the case where no operation body is recognized in the acquired image (St135: No), recognition of the target object by the object recognition processing unit 104 (St131) is performed again.

In the case where the distance between the operation body and the target object is equal to or less than a predetermined value set in advance (St137: Yes), the contact determination unit 105 detects the normal line vector on the surface of the target object, and calculates the normal line direction (St138). In the case where the distance between the operation body and the target object is larger than the predetermined value (St137: No), recognition of the target object by the object recognition processing unit 104 (St131) is performed again.

Thereafter, the contact determination unit 105 compares the inclination of the normal line direction with the contact determination threshold value T, and determines that the operation body is in contact with the target object (St140) when the inclination of the normal line direction exceeds the contact determination threshold value T (St139: Yes) as described above. In the case where the inclination of the normal line direction is smaller than the contact determination threshold value T (St139: No), recognition of the target object by the object recognition processing unit 104 (St131) is performed again.

In the case where contact of the operation body with the target object is determined, the contact determination unit 105 supplies, to the input control unit 106, the contact position with the acquired image. The input control unit 106 controls an operation input on the basis of the position of the icon P displayed on the operation image G and the contact position supplied from the contact determination unit 105. The input control unit 106 can regard the icon P superimposed on the contact position as being selected, for example.

The information processing apparatus 100 is capable of performing also such an operation. By using the depth information, the information processing apparatus 100 is capable of acquiring the distance between the operation body and the target object, and performing contact determination by using the change in the normal line vector only in the case where the distance between the operation body and the target object is sufficiently small and the possibility of contact is high.

(Contact and Operation Determination Operations of Information Processing Apparatus)

Figure 12:
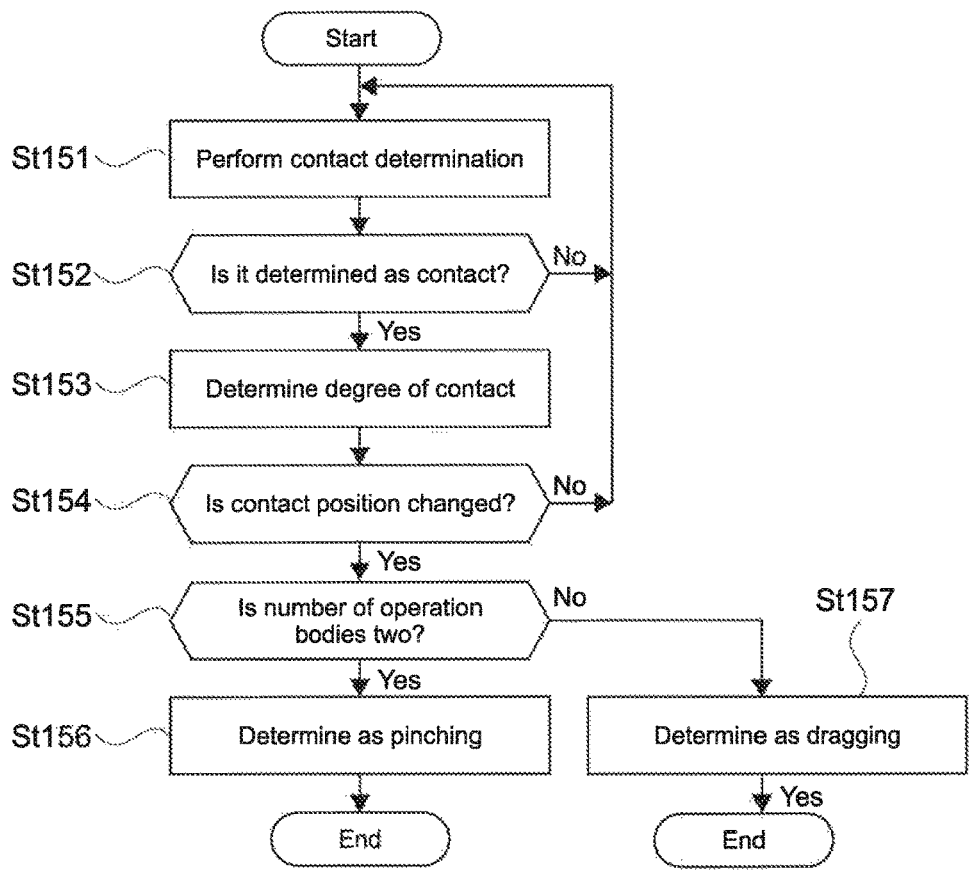
FIG. 12 A flowchart showing an operation of the information processing apparatus.

The Information processing apparatus 100 is capable of determining the type (dragging, pinching, etc.) of a contact operation as well as contact between the operation body and the target object. FIG. 12 is a flowchart showing contact and operation determination operations of the information processing apparatus 100.

The flow of the step of contact determination (St151) is the same as that of the contact determination operation shown in FIG. 6. Further, the flow of the same step (St151) may be the same as that of the contact determination operation depending on the kind of the target object shown in FIG. 10 or the contact reaction operation combined by the usage of depth information shown in FIG. 11.

In the case where contact is determined in the contact determination step (St152: Yes), the contact determination unit 105 determines the degree of contact (pressing) of the operation body with the target object (St153). The contact determination unit 105 is capable of obtaining the degree of contact from the magnitude of the inclination when the inclination of the normal line direction exceeds the contact determination threshold value T. In the case where no contact is determined in the contact determination step (St152: No), the step of contact determination (St151) is repeated.

The contact determination unit 105 supplies, to the input control unit 106, the contact position with the acquired image and the degree of pressing force of the operation body on the target object. The input control unit 106 determines whether or not the contact position between the operation body and the target object is changed (St154). In the case where the contact position is changed (St154: Yes), the input control unit 106 determines whether or not the number of operation bodies is two (St155). In the case where the contact position is not changed (St155: No), the step of contact determination (St151) is performed again.

In the case where the number of operation bodies is two (St155: Yes), the input control unit 106 determines that the operation by the operation body is pinching. On the other hand, in the case where the number of operation bodies is not two, the input control unit 106 determines that the operation by the operation body is dragging. Note that in the case where the number of operation bodies is two, the input control unit 106 may determine it as dragging (multi-touch dragging) by a plurality of operation bodies in the case where the movement directions of the contact places are substantially in parallel with each other. Further, in the case where the operation by the operation body is pinching, the input control unit 106 may determine that the operation is pinching in or pinching out depending on the movement direction of the contact place.

Figure 13:
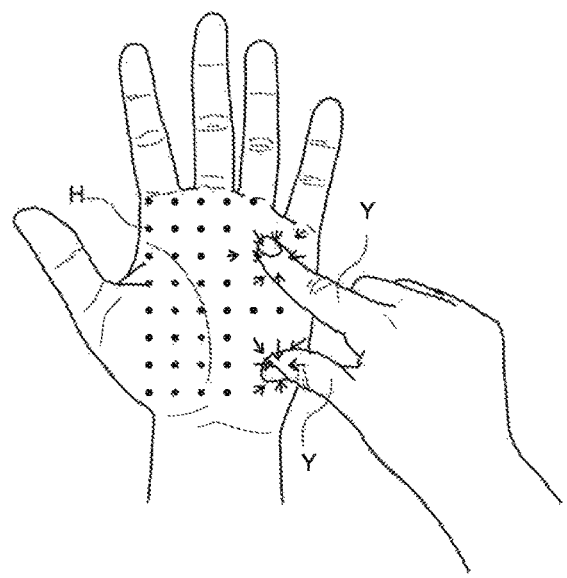
FIG. 13 A schematic diagram showing the shape of the operation body.

At this time, the input control unit 106 may determine the type of the operation by using the object recognition result acquired from the object recognition processing unit 104. FIG. 13 is a schematic diagram showing the shape of a finger as the operation body. In the case where a particular shape of the operation body (e.g., orientation of the finger) is registered in the object recognition dictionary D in advance, the object recognition processing unit 104 supplies the information to the input control unit 106. The input control unit 106 is capable of using the shape of the operation body for determination of the type of operation. For example, in the example shown in FIG. 13, the object recognition processing unit 104 can recognize that the shape of the fingers is a shape for the pinching operation (U-shape formed by the thumb and the index finger), and the input control unit 106 can determine that the operation is a pinching operation only in the case where the shape of the fingers is a shape for the pinching operation.

The input control unit 106 controls an operation input depending on the type of the operation by the operation body. At this time, the input control unit 106 may change the degree of effects (cursor movement speed, a scroll speed, etc.) by dragging depending on the degree of the pressing force of the operation body on the target object.

Figure 14:
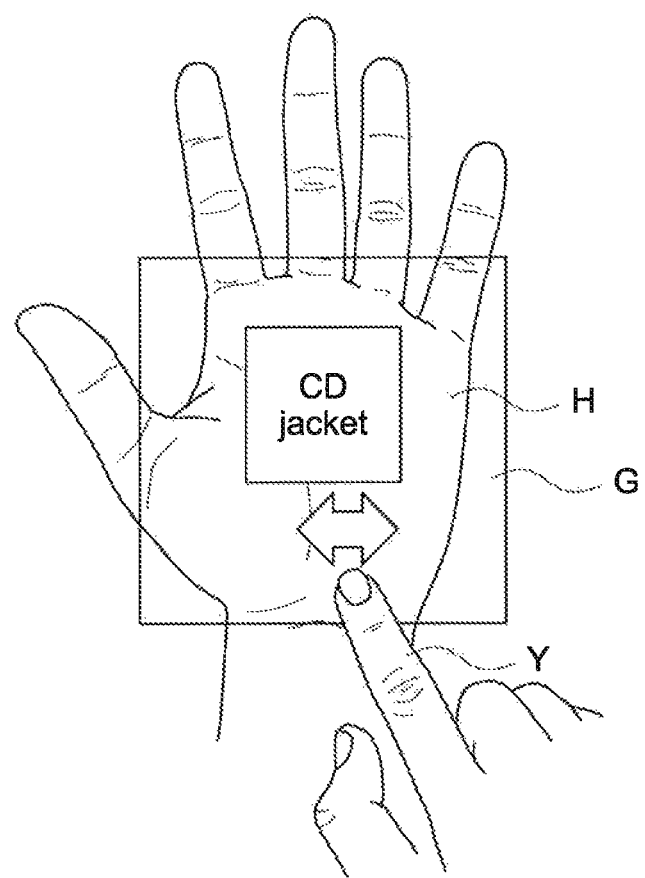
FIG. 14 A schematic diagram showing the state of an operation input by the operation body.

FIG. 14 shows an example of the UI of a music reproduction application by the above-mentioned operation of the information processing apparatus 100. As shown in the figure, the information processing apparatus 100 is capable of selecting the sound volume, music to be reproduced, or the like, depending on the direction or degree of pressing of the operation body on the target object.

[Second Embodiment]

An information processing apparatus according to a second embodiment of the present technology will be described.

(Configuration of Information Processing Apparatus)

Figure 15:
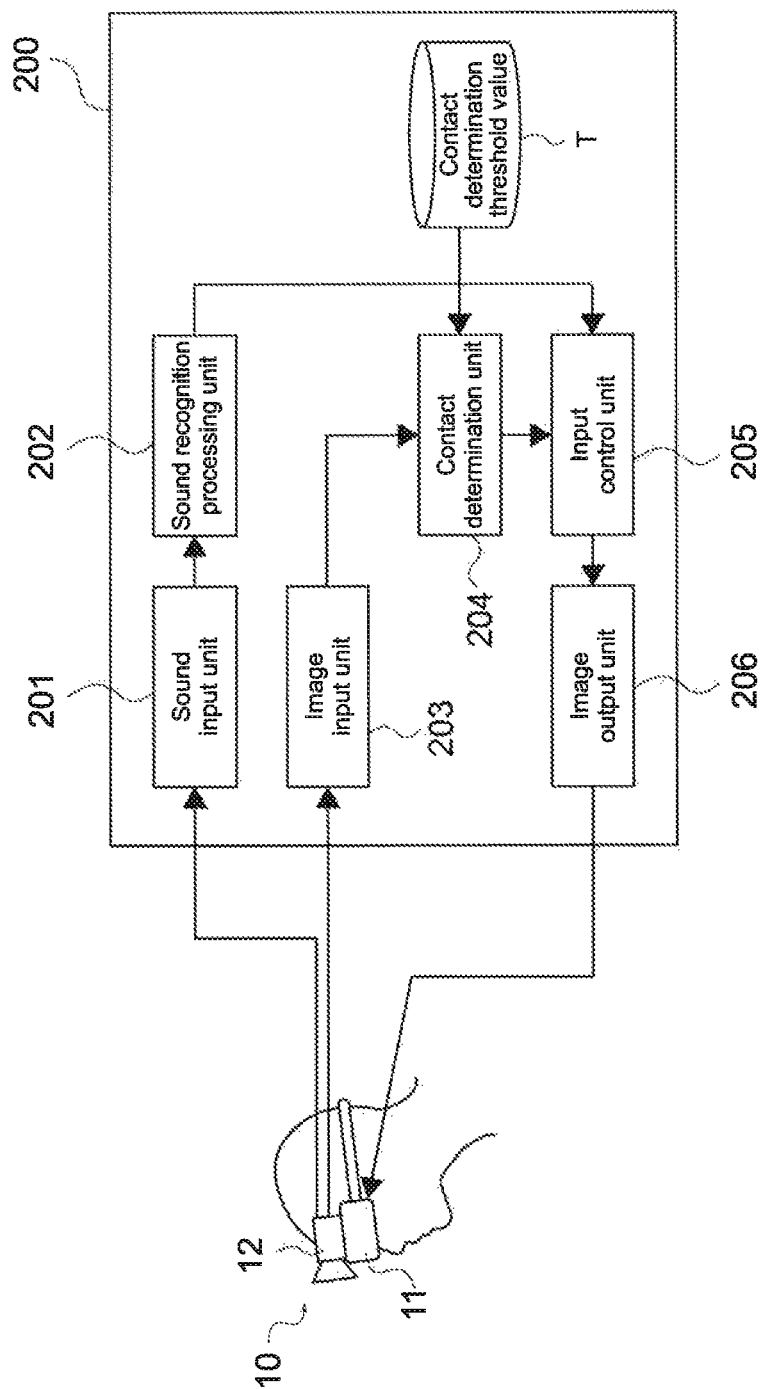
FIG. 15 A schematic diagram showing the configuration of an information processing apparatus according to a second embodiment of the present technology.

FIG. 15 is a schematic diagram showing the functional configuration of an information processing apparatus 200 according to the second embodiment of the present technology. As shown in the figure, the information processing apparatus 200 includes a sound input unit 201, a sound recognition processing unit 202, an image input unit 203, a contact determination unit 204, an input control unit 205, and an image output unit 206. The information processing apparatus 200 according to this embodiment includes no object recognition processing unit.

As shown in the figure, the information processing apparatus 200 can be connected to the eyewear 10. Because the configuration of the eyewear 10 is similar to that in the first embodiment, description thereof will be omitted.

The sound input unit 201 is connected to the microphone of the eyewear 10. The audio signal of a sound collected by the microphone is input to the sound input unit 201. The sound input unit 201 outputs the acquired audio signal to the sound recognition processing unit 202.

The sound recognition processing unit 202 performs audio recognition processing on the audio signal supplied from the sound input unit 201, and recognizes the operation sound by a user. In the case where the operation sound is recognized, the sound recognition processing unit 202 supplies the audio recognition result to the input control unit 205.

The image input unit 203 is connected to the camera 12. An image (moving image) picked up by the camera 12 is input to the image input unit 203. The image input unit 203 supplies the image acquired from the camera 12 (hereinafter, acquired image) to the contact determination unit 204.

The contact determination unit 204 performs contact determination on the acquired image supplied from the image input unit 203 by using the contact determination threshold value T. Details of this processing will be described later. The contact determination unit 204 supplies the determination result to the input control unit 205. The contact determination threshold value T may be stored in the information processing apparatus 200, or the contact determination unit 204 may acquire the contact determination threshold value T from a network or the like.

The input control unit 205 controls an operation input by a user on the basis of the recognition result supplied from the sound recognition processing unit 202 or the determination result supplied from the contact determination unit 204. Specifically, the input control unit 205 receives the contact position, pressing force, or pressing direction of an operation body with a target object, movement of an operation body after the contact, or the like, as an operation input of touching, multi-touching, dragging, pinching, or the like. The input control unit 205 supplies the received operation input to the OS of the information processing apparatus 200 or the like.

The image output unit 206 generates an image (moving image) displayed on the display 11. The image output unit 206 is capable of generating an operation image including an icon and an operation button. Similarly to the first embodiment, the user visually confirms the field of view in which videos displayed on the display 11 and the real object are superimposed one another (see FIG. 2 and FIG. 3).

The information processing apparatus 200 may be connected to an apparatus including a camera capable of displaying or projecting videos on the target object and imaging the target object, in addition to the eyewear 10.

The above-mentioned functional configuration of the information processing apparatus 200 may be connected or incorporated to/in an image projection apparatus such as an eyewear and a projector, or mounted on a PC, smartphone, or the like different from the image projection apparatus. Further, the whole or a part of the functional configuration may be on a network.

The above-mentioned functional configuration of the information processing apparatus 200 can be achieved by the hardware configuration shown in the first embodiment.

(Contact Determination Operation of Information Processing Apparatus)

Figure 16:
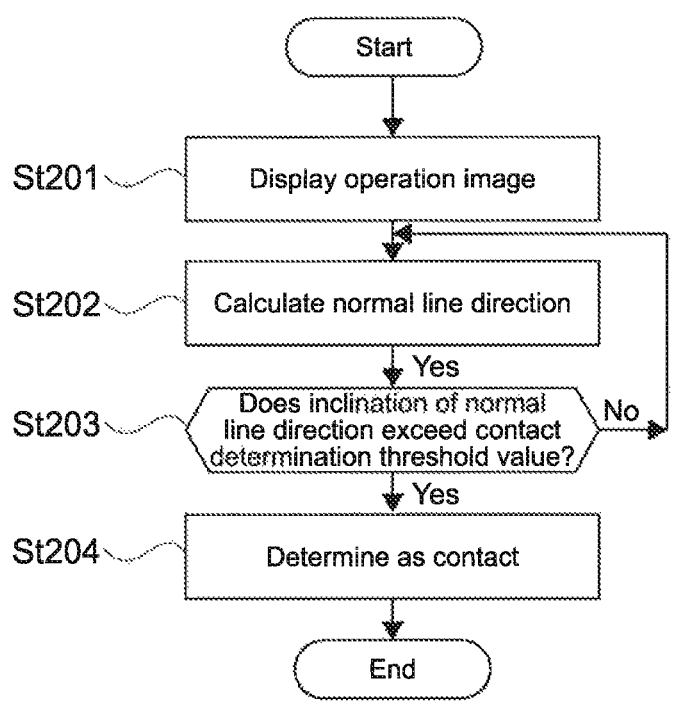
FIG. 16 A flowchart showing an operation of the information processing apparatus.

An operation of the information processing apparatus 200 will be described. FIG. 16 is a flowchart showing the operation of the information processing apparatus 200. As described above, the camera 12 picks up an image, and the image (acquired image) is acquired by the image input unit 203. The image input unit 203 supplies the acquired image to the contact determination unit 204.

The image output unit 206 supplies the operation image G (see FIG. 2) to the display 11, and causes the display 11 to display the operation image G (St201). In contrast to the first embodiment, recognition processing of the target object is not performed. However, the user is capable of aiming the display 11 at the target object (desk or wall surface), thereby projecting the operation image G on the target object.

The contact determination unit 204

The contact determination unit 204 compares the inclination of the normal line direction with the contact determination threshold value T, and determines that the operation body is in contact with the target object (St204) when the change in the normal line direction exceeds the contact determination threshold value T (St203: Yes). In the case where the change in the normal line direction is smaller than the contact determination threshold value T (St203: No), calculation of the normal line direction (St202) is performed again.

In the case where contact of the operation body with the target object is determined, the contact determination unit 204 supplies, to the input control unit 205, the contact position with the acquired image. The input control unit 205 controls an operation input on the basis of the contact determination result supplied from the contact determination unit 204.

The information processing apparatus 200 performs such an operation. Since an image picked up by the camera 12 capable of performing polarization imaging can be used to detect contact of the operation body with the target object as described above, it does not need to provide a sensor for detecting contact in addition to the camera 12. Therefore, it is possible to reduce the size in the contact detection system and the cost. Further, because an infrared ray or the like is not used to detect contact, it can be used outside.

Further, the information processing apparatus 200 detects contact by using the change in the normal line direction caused due to contact of the operation body with the target object. Therefore, the information processing apparatus 100 does not detect contact when the operation body approaches the target object or is slightly in contact with the target object, and detects contact only when the operation body is certainly in contact with the target object. Therefore, it is possible to detect contact of the operation body with the target object with high precision.

The information processing apparatus 200 performs such an operation. Note that the information processing apparatus 200 may perform contact determination (see FIG. 11) by using the change in a color and depth information, similarly to the first embodiment. Further, the information processing apparatus 200 may determine the type of the operation by contact after the contact determination (see FIG. 12).

Note that although the case where the operation body is a finger has been described in the above, the operation body is not limited to a finger and may be a stylus or the like. Further, also the target object is not limited to a palm as long as the shape of the surface thereof is changed by contact of the operation body with the target object.

It should be noted that the present technology may take the following configurations.

(1)

An information processing apparatus, including
a contact determination unit that determines contact of an operation body with a target object on the basis of a change in a normal line vector on a surface of the target object, the target object being an operation target of the operation body.

(2)

The information processing apparatus according to (1) above, further including
an object recognition processing unit that recognizes the operation body and the target object included in a picked-up image, in which
the contact determination unit determines contact of the operation body with the target object on the basis of a change in a normal line vector on a surface of the target object around the operation body.

(3)

The information processing apparatus according to (1) or (2) above, in which
the contact determination unit determines contact of the operation body with the target object depending on an inclination of the normal line vector in a direction of the operation body.

(4)

The information processing apparatus according to any one of (1) to (3) above, in which
the contact determination unit determines contact of the operation body with the target object depending on disturbance of an inclination of the normal line vector.

(5)

The information processing apparatus according to any one of (1) to (4) above, further including
an input control unit that controls an operation input on the basis of a determination result of the contact determination unit.

(6)

The information processing apparatus according to any one of (1) to (5) above, further including
an object recognition processing unit that recognizes the operation body and the target object included in a picked-up image, in which
the input control unit controls an operation input on the basis of a shape of the operation body recognized by the object recognition processing unit and a determination result of the contact determination unit.

(7)

The information processing apparatus according to any one of (1) to (6) above, further including
an image output unit that generates an operation target image superimposed on the target object, in which
the input control unit controls an operation input on the basis of a positional relationship between the operation body and the target object in the operation target image.

(8)

The information processing apparatus according to any one of (1) to (7) above, in which
the contact determination unit determines that the operation body is in contact with the target object when an inclination of the normal line vector exceeds a threshold value.

(9)

The information processing apparatus according to any one of (1) to (8) above, further including
an object recognition processing unit that recognizes the operation body and the target object included in a picked-up image, in which
the contact determination unit determines the threshold value depending on a kind of the target object.

(10)

The information processing apparatus according to any one of (1) to (9) above, in which
the contact determination unit further determines the threshold value depending on a position of a surface of the target object.

(11)

The information processing apparatus according to any one of (1) to (10) above, in which
the contact determination unit calculates a degree of contact of the operation body with the target object depending on a magnitude of an inclination of the normal line vector when an inclination of the normal line vector is larger than the threshold value.

(12)

The information processing apparatus according to any one of (1) to (11) above, further including
an object recognition processing unit that recognizes the operation body and the target object included in a picked-up image, in which
the contact determination unit determines contact of the operation body with the target object on the basis of a change in a color of the picked-up image when the target object is a rigid body, and determines contact of the operation body with the target object on the basis of a change in the normal line vector when the target object is not a rigid body.

(13)

The information processing apparatus according to any one of (1) to (12) above, in which the contact determination unit determines contact of the operation body with the target object on the basis of a change in the normal line vector when a distance between the target object and the operation body is equal to or less than a predetermined value.

(14)

The information processing apparatus according to any one of (1) to (13) above, in which the contact determination unit detects the normal line vector from a picked-up image picked up by polarization imaging.

(15)

A program that causes an information processing apparatus to function as a contact determination unit that determines contact of an operation body with a target object on the basis of a change in a normal line vector on a surface of the target object, the target object being an operation target of the operation body.

(16)

An information processing method, including determining, by a contact determination unit, contact of an operation body with a target object on the basis of a change in a normal line vector on a surface of the target object, the target object being an operation target of the operation body.

DESCRIPTION OF REFERENCE NUMERALS 100, 200 information processing apparatus
101, 201 sound input unit
102, 202 audio recognition processing unit
103, 203 image input unit
104 object recognition processing unit
105, 204 contact determination unit
106, 205 input control unit
107, 206 image output unit

The invention claimed is:

1. An information processing apparatus, comprising:
an object recognition processing unit configured to recognize an operation body and a target object included in an acquired image; and
a contact determination unit configured to determine contact of the operation body with the target object on the basis of a change from a non-contact state in at least one normal line vector indicating deformation of a surface of the target object in an area around the operation body,
wherein an operation input is determined according to a position of the determined contact of the operation body with the surface of the target object,
wherein the target object is an operation target of the operation body, and
wherein the object recognition processing unit and the contact determination unit are each implemented via at least one processor.

2. The information processing apparatus according to claim 1,
wherein the contact determination unit determines contact of the operation body with the target object depending on an inclination of the normal line vector in a direction of the operation body.

3. The information processing apparatus according to claim 1,
wherein the contact determination unit determines contact of the operation body with the target object depending on disturbance of an inclination of the normal line vector.

4. The information processing apparatus according to claim 1, further comprising
an input control unit configured to control the operation input on the basis of a determination result of the contact determination unit,
wherein the input control unit is implemented via at least one processor.

5. The information processing apparatus according to claim 4,
wherein the input control unit controls the operation input on the basis of a shape of the operation body recognized by the object recognition processing unit and a determination result of the contact determination unit.

6. The information processing apparatus according to claim 4, further comprising
an image output unit configured to generate an operation target image superimposed on the target object,
wherein the input control unit controls the operation input on the basis of a positional relationship between the operation body and the target object in the operation target image, and
wherein the image output unit is implemented via at least one processor.

7. The information processing apparatus according to claim 1,
wherein the contact determination unit determines that the operation body is in contact with the target object when an inclination of the normal line vector exceeds a threshold value.

8. The information processing apparatus according to claim 7,
wherein the contact determination unit determines the threshold value depending on a kind of the target object.

9. The information processing apparatus according to claim 8,
wherein the contact determination unit further determines the threshold value depending on the position of the determined contact of the operation body with the surface of the target object.

10. The information processing apparatus according to claim 7,
wherein the contact determination unit is further configured to calculate a degree of contact of the operation body with the target object depending on a magnitude of the inclination of the normal line vector when the inclination of the normal line vector is larger than the threshold value.

11. The information processing apparatus according to claim 1,
wherein the contact determination unit determines contact of the operation body with the target object on the basis of a change in a color of the acquired image when the target object is a rigid body, and determines contact of the operation body with the target object on the basis of the change in the normal line vector when the target object is not a rigid body.

12. The information processing apparatus according to claim 1,
wherein the contact determination unit determines contact of the operation body with the target object on the basis of the change in the normal line vector when a distance between the target object and the operation body is equal to or less than a predetermined value.

13. The information processing apparatus according to claim 1,
wherein the contact determination unit is further configured to detect the normal line vector from the acquired image, and
wherein the acquired image is picked up by polarization imaging.

14. A non-transitory computer-readable medium having embodied thereon a program, which when executed by a computer causes the computer to execute a method, the method comprising:
recognizing an operation body and a target object included in an acquired image; and
determining contact of the operation body with the target object on the basis of a change from a non-contact state in at least one normal line vector indicating deformation of a surface of the target object in an area around the operation body,
wherein an operation input is determined according to a position of the determined contact of the operation body with the surface of the target object, and
wherein the target object is an operation target of the operation body.

15. An information processing method, implemented via at least one processor, the method comprising:
recognizing an operation body and a target object included in an acquired image; and
determining contact of the operation body with the target object on the basis of a change from a non-contact state in at least one normal line vector indicating deformation of a surface of the target object in an area around the operation body,
wherein an operation input is determined according to a position of the determined contact of the operation body with the surface of the target object, and
wherein the target object is an operation target of the operation body.

16. The information processing apparatus according to claim 1,
wherein the target object comprises a palm.

17. The information processing apparatus according to claim 1,
wherein the operation body comprises at least one of a finger or a stylus.

18. The information processing apparatus according to claim 1,
wherein the contact determination unit determines contact of the operation body with the target object on the basis of a change in a plurality of normal line vectors.

* * * * *